CALCULATING APPARATUS WITH DISPLAY MEANS

Filed July 27, 1964 Sheet 1 of 2

INVENTOR
THOMAS J. SCUITTO
BY Samuel Lindenberg
Arthur Freilich
ATTORNEYS

INVENTOR
THOMAS J. SCUITTO
BY Samuel Lindenberg
Arthur Freilich
ATTORNEYS

United States Patent Office 3,428,793

Patented Feb. 18, 1969

3,428,793

CALCULATING APPARATUS WITH DISPLAY MEANS

Thomas J. Scuitto, Malibu, Calif., assignor to Wyle Laboratories, El Segundo, Calif., a corporation of California Filed July 27, 1964, Ser. No. 385,203

U.S. Cl. 235—160 2 Claims

Int. Cl. G06f 6/44

ABSTRACT OF THE DISCLOSURE

A calculator apparatus including a plurality of multidigit number storage registers together with means for continually displaying the contents of said registers. Keyboard means are also provided which enable an operator to initiate selected operations with respect to the displayed numbers. Such operations may generate overflows which are recognized and which cause an overflow symbol to be displayed in association with the overflowed number. Means are also provided for displaying symbols identifying registers and stages "from" which or "to" which digits are to be transferred.

This invention relates generally to improvements in electronic calculating apparatus.

U.S. Patents No. 3,330,946 discloses a calculating apparatus incorporating a small memory, for example of the magnetic disc type, which defines a plurality of multistage number storing registers. Means are provided for entering multidigit numbers (one digit per stage) into any of the registers. Additional means are provided for accessing any of the stored numbers, for initiating arithmetic operations thereon, and for subsequently storing the results of an operation back into a selected register. Output means including visual display means are provided for continually displaying the numbers stored in the register.

U.S. Patent No. 3,305,843 discloses one type of display apparatus suitable for use with the calculating apparatus of the aforementioned patent application. The display apparatus makes use of a cathode ray tube which displays the number stored in each register at a different vertical position on the tube face. The digits of each number any of the rigsisters. Additional means are provided for extend horizontally across the tube face with the most significant digit positioned at the left and the least significant digit positioned at the right.

The calculating apparatus described in the aforementioned U.S. Patent No. 3,330,946 includes a keyboard which enables an operator to initiate any one of a plurality of operations with respect to the numbers stored in the memory. Amongst several different operations, the operator is able to enter information into a selected register either by defining digits via numeric keys on the keyboard or by transferring information from another selected register.

In order to facilitate the correct operation of the calculating apparatus and thus reduce the likelihood of any operator-introduced errors, it is an object of the present invention to provide means in apparatus of the aforedescribed type for visually identifying on the display means, the register and position in which a digit is about to be entered and from which digits are being transferred.

In the course of processing numbers in apparatus which has a finite storage capacity, situations sometimes arise in which the numbers overflow, i.e., exceed the storage capacity. One such situation is amply demonstrated in U.S. Patent No. 3,375,356 which describes how an indicator is set in repsonse to the overflow condition. The condition of course can also result from the performance of certain arithmetic operations.

Inasmuch as it is desirable that the operator be made aware as soon as possible of the overflow indicator being set, it is a further object of the present invention to provide means responsive to said overflow indicator for visually indicating an overflow condition on said display means.

In accordance with a preferred embodiment of the invention, first and second additional display positions are defined on the display means immediately to the left and right of the positions displaying the digits stored in the registers. When a register, from which information is to be transferred, is initially identified in preparation for a transfer operation, a symbol is displayed in the display position to the left of the digit display positions of that register. Thus, prior to actually initiating a transfer operation, the operator is able to see whether he has identified the proper register. When the overflow indicator is set, a symbol is displayed in the display position to the right of the digit display positions of all of the registers. The position into which a digit is about to be entered is identified by brightening the symbol in the appropriate digit display position.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
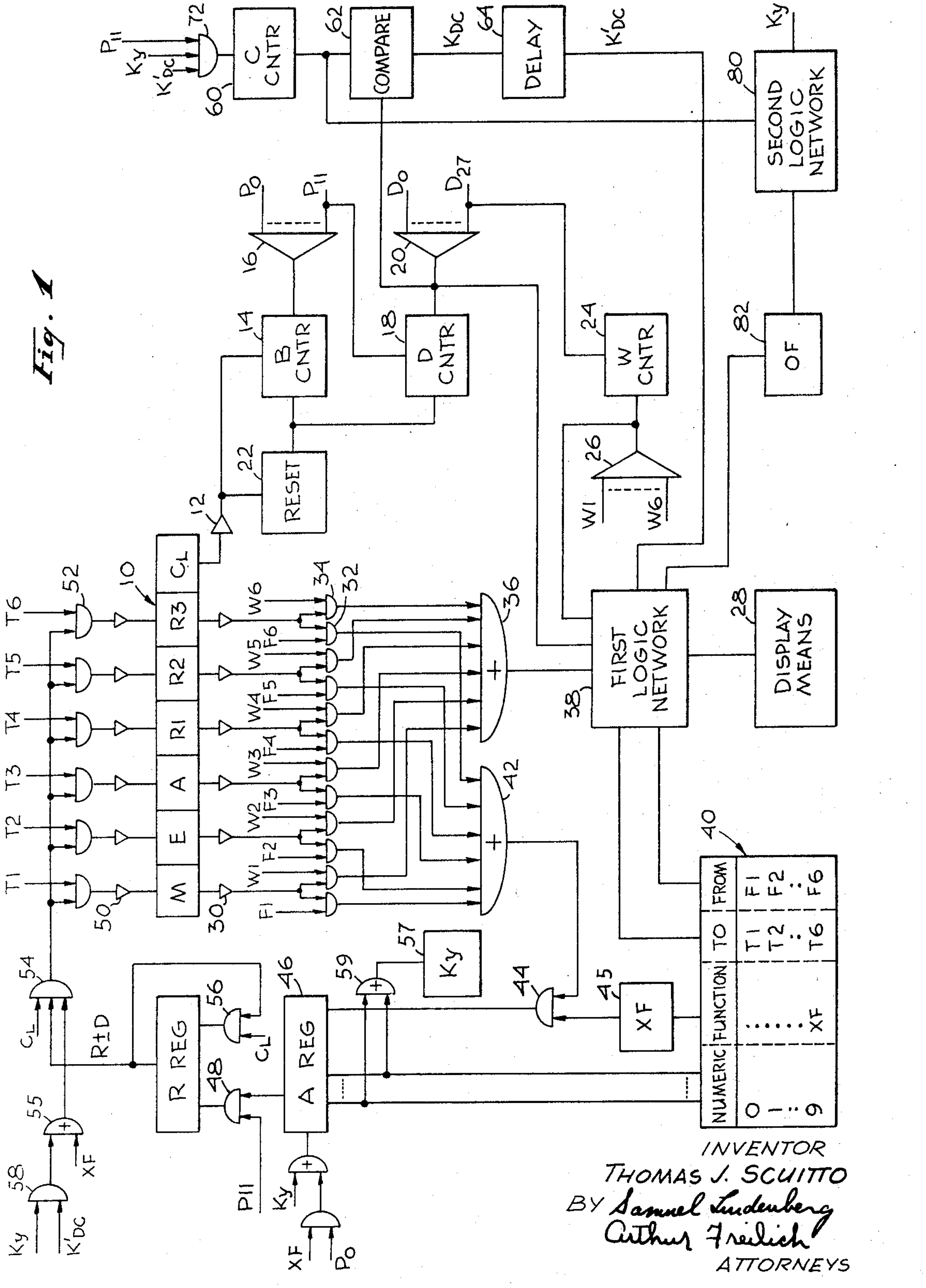
FIGURE 1 is a block diagram of a portion of a calculating apparatus in which the invention can be advantageously employed.

Attention is now called to FIGURE 1 of the drawings which illustrates a calculating apparatus of the type which can advantageously employ the teachings of the invention herein. As discussed in much greater detail in the aforecited U.S. Patent No. 3,330,946, the calculating apparatus includes a memory 10 which can for example, be of the movable magnetic media type such as a disc or drum. The memory 10 can be provided with a plurality of tracks which in addition to a clock (*Cl*) track can include a plurality of register tracks respectively identified as the multiplier-quotient (M) register, the entry (E) register, the accumulator (A) register, and three reserve or scratch pad registers R1, R2, and R3. Each of the register tracks can include a plurality of digit and timing sectors followed by a gap. For purposes herein, it will be assumed that each register track includes 24 digit sectors, four timing sectors, and the gap. Each of the sectors in turn can include a plurality of bit positions, e.g., nine, and a plurality of space positions, e.g., three. The initial position (P0) and the last two positions (P10, P11) in each digit sector are provided for control purposes. The nine intermediate positions (P1–P9) in each digit sector are utilized to store a mark or pulse in accordance with an incremental digital code. That is, in order to store the digit "9," one pulse can be recorded in each of the nine positions (P1–P9) of a selected digit sector. In order to to store the number "932" in a selected register, nine pulses can be recorded in the hundred's digit section thereof, three pulses in the ten's digit sector thereof, and two pulses in the unit's digit sector thereof. Information can be so recorded in each of the memory tracks other than the clock track.

The clock track has a pulse recorded in alignment with each bit and space position around the surface of the disc or drum. The output of the clock track is coupled through an amplifier 12 to an incrementing input terminal of a B counter 14. The B counter is a scale of twelve counter and consequently has a cycle time equal to the time it takes for stored information to be read from a complete digit sector. The output of the B counter 14 is connected to the input of a decoding network 16 which is provided with twelve output terminals respectively identified as P0 through P11. The B counter 14 changes state in response to each clock pulse applied thereto and a signal is provided on a different one of the decoding circuit 16 output terminals for each count defined by the B counter. Output terminal P11 is connected to the input of a D counter 18 for the purpose of incrementing the D counter in response to each cycle of the B counter. The D counter is a scale of twenty-eight counter and is capable of defining states D0 through D27 The output of the D counter is connected to the input of a decoding circuit 20 which is provided with 28 output terminals respectively identified as D0 through D27. A signal is applied to a different one of these output terminals in response to each different count defined by the D counter 18.

A reset circuit 22 is also connected to the output of clock track amplifier 12. The output of the reset circuit is connected to the inputs of both and B and D counters. The reset circuit 22 is responsive to the gap sensed by the amplifier 12 once each memory cycle. The B and D counters are both reset to a zero count in response to the gap being recognized.

A W counter 24 is provided which is incremented in response to each cycle of the D counter 18. Thus, the output terminal D27 from the decoding circuit 20 is connected to the incrementing input terminal of the W counter 24. The W counter is a scale of six counter and its output is connected to the input of a decoding circuit 26 which is provided with six output terminals identified as W1 through W6. A signal is applied to a different one of the decoding circuit 26 output terminals in response to each different count defined by the W counter. As will be seen, each count of the W counter, is used to cause the contents of a different one of the momory registers to be displayed by display means 28. A readout head and amplifier 30 is provided to read the contents of each of the register tracks. The output from each amplifier 30 is connected to the input of a pair of And gates 32 and 34. And gates 32 are utilized for the purpose of transferring information from one register to another while And gates 34 are utilized for the purpose of transferring information to the display means 28. The display function will be considered first.

The outputs from all of the And gates 34 are connected to the inputs of an Or gate 36 whose output is connected to the input of a first logic network 38. The output of the logic network 38 controls the display means 28. As noted, the first input to each of the And gates 34 is derived from a different one of the register track output amplifiers 30. The second input to each of the And gates 34 is derived from a different one of the output terminals of decoding circuit 26. Thus, as long as the memory 10 continues to move, clock pulses will continue to be applied to the B counter thus incrementing the B. D, and W counters. Accordingly, the register track outputs will be coupled through Or gate 36 to the logic network 38 in sequence. The digits in each register track will of course be serially provided to the logic network 38.

The first input to each of the And gates 32 is also derived from the output of a different one of the register track amplifiers 30. The second input to each of the And gates 32 is derived from a different one of six FROM switches F1 through F6 available to an operator on the keyboard 40. The keyboard 40, as discussed in greater detail in the aforecited patents, includes a plurality of FUNCTION keys each of which is adapted to initiate a different operation with respect to the numbers stored in the register tracks, a plurality of TO keys T1 through T6 and nine numeric keys. Each of the TO, FROM, and FUNCTION keys is connected to set a different flip-flop which then retains its state until an opeartion is completed. All of the numeric keys are connected so as to set a key or Ky flip-flop which initiates an entry operation and retains its state until the opeartion is completed.

Each of the keys F1 through F6 identifies a different one of the register tracks from which information should be accessed for subsequent transfer to a selected register identified by actuation of the appropriate TO key T1 through T6. The outputs from the And gates 32 are connected to the input of an Or gate 42 whose output is connected to the input of an And gate 44.

Although the aforecited patents discuss several different FUNCTION keys and the operations performed in response to the actuation thereof, the present patent application is directed to the operation initiated only in response to the actuation of the TRANSFER function key. In addition, the present invention is concerned with operations initiated in response to the actuation of any one of the numeric keys.

In order to transfer information from a first selected register track to a second selected register track, the first register track is identified by actuation of one of the FROM keys F1 through F6. The actuation of one of the FROM keys enables one of the And gates 32 to cause the output of the corresponding register track to be coupled to the input of And gate 44 which is subsequently enabled when the TRANSFER function key is actuated to thereby set the transfer (XF) flip-flop 45. The output of And gate 44 is connected to the incrementing input terminal of an A register 46. Thus, after the appropriate FROM key and TRANSFER function key have been actuated, during each succeeding digit period, the A register will be incremented to a count equal to the number of pulses read from a digit sector during that period. The A register will be transferred in parallel through And gate 48 to an R register during period P11 of each digit period and the A register will be reset to a zero count during period P0 of the next digit period. The contents of the R register will then be written into the register identified by the actuated TO key.

More particularly, connected to the input of each of the register tracks is an input head and amplifier 50 which derives information from the output of a corresponding And gate 52. Each of the And gates 52 is enabled by the actuation of a different one of the TO keys T1 through T6. A common input to all of the And gates 52 is derived from an And gate 54 which, when writing is to take place, provides a plurality of output pulses equal to the digit value stored in the R register. The gate 54 is enabled through Or gate 55 throughout the performance of the transfer operation. In order for the gate 54 to pass a number of pulses equal to the digit in the R register, an And gate 56 is provided whose output is connected to the decrementing input terminal of the R register. Thus, in response to each clock pulse for so long as the R register stores a non-zero count, the R register is decremented by one by the gate 56. When the count in the R register reaches zero, the gates 54 and 56 are both disabled.

During the transfer operation, as the pulses from each digit sector in the selected FROM register track are sensed, they are applied to the A register such that at the end of that digit period, the A register stores a count corresponding to the digit stored in the digit sector just read from the designated register track. During period P11 of that digit period, the contents of the A register are transferred in parallel to the R register and during the succeeding digit period, the contents of the R register are written into the selected register track. By spacing the read and write heads of the register track by the equivalent of one digit period, the digit read from a sector in the first register can be written into the corresponding sector of the second register. During the transfer operation, the A register is reset during period P0 of every digit period and the gate 54 is enabled for a complete memory cycle by the output of Or gate 55.

In order to enter information into a selected register from the keyboard 40, rather than by transferring the information from another selected register, a control (C) counter 60 is utilized in conjunction with a comparison means 62. Thus, the C counter 60 can be set to define any desired digit sector. When the counts in the D and C counters coincide, the compare means 62 will provide a coincident signal $K_{DC}$. The signal $K_{DC}$ is applied to a delay means 64 which in turn provides a signal delayed by one digit period, i.e., $K'_{DC}$. The signal $K'_{DC}$ can be employed to control the writing of a digit into a selected register. Thus, assume that one of the TO keys is actuated to thus select one of the And gates 52. Then, assume that a selected one of the numeric keys is actuated to initially reset the A register and then force it to a count represented by that key. During period P11 of each succeeding digit period, the contents of the A register will be transferred through the And gate 48 to the R register. The output of the Ky flip-flop 57 is connected to a first input terminal of And gate 58 and the output of the delay means 64 is likewise connected to the input of gate 58. Thus, And gate 54 will be enabled only during the digit period in which signal $K'_{DC}$ is developed when information is being entered from the keyboard. The contents of the A register will be transferred to the R register during every digit period but of course this will have no affect on the register tracks as long as gate 54 is not enabled. Thus, by manually controlling the C counter, a digit can be entered into a selected position in a selected register track. In order to facilitate the entry of digits into a selected register track, an And gate 72 connected to the incrementing input terminal of the C counter 60 is provided to automatically increment the counter after a digit is entered to thus enable a subsequent digit to be entered via the keyboard numeric keys without requiring that the C counter be manually reset for each digit. As should be apparent from the inputs to gate 72, the C counter will be incremented during period P11 during the digit period in which the signal $K'_{DC}$ is developed when the Ky flip-flop 57 is set.

For the sake of simplicity is explanation, it has been assumed that only one TO key and only one FROM key were actuated at any one time. In fact, it should be clear that several TO keys can be simultaneously actuated in order to enter the same number into more than one register. By actuating several FROM keys together, two numbers can be effectively combined, i.e., during each digit period the R register will be driven to a count equal to the greater of two digits applied thereto.

Figures 2, 3:
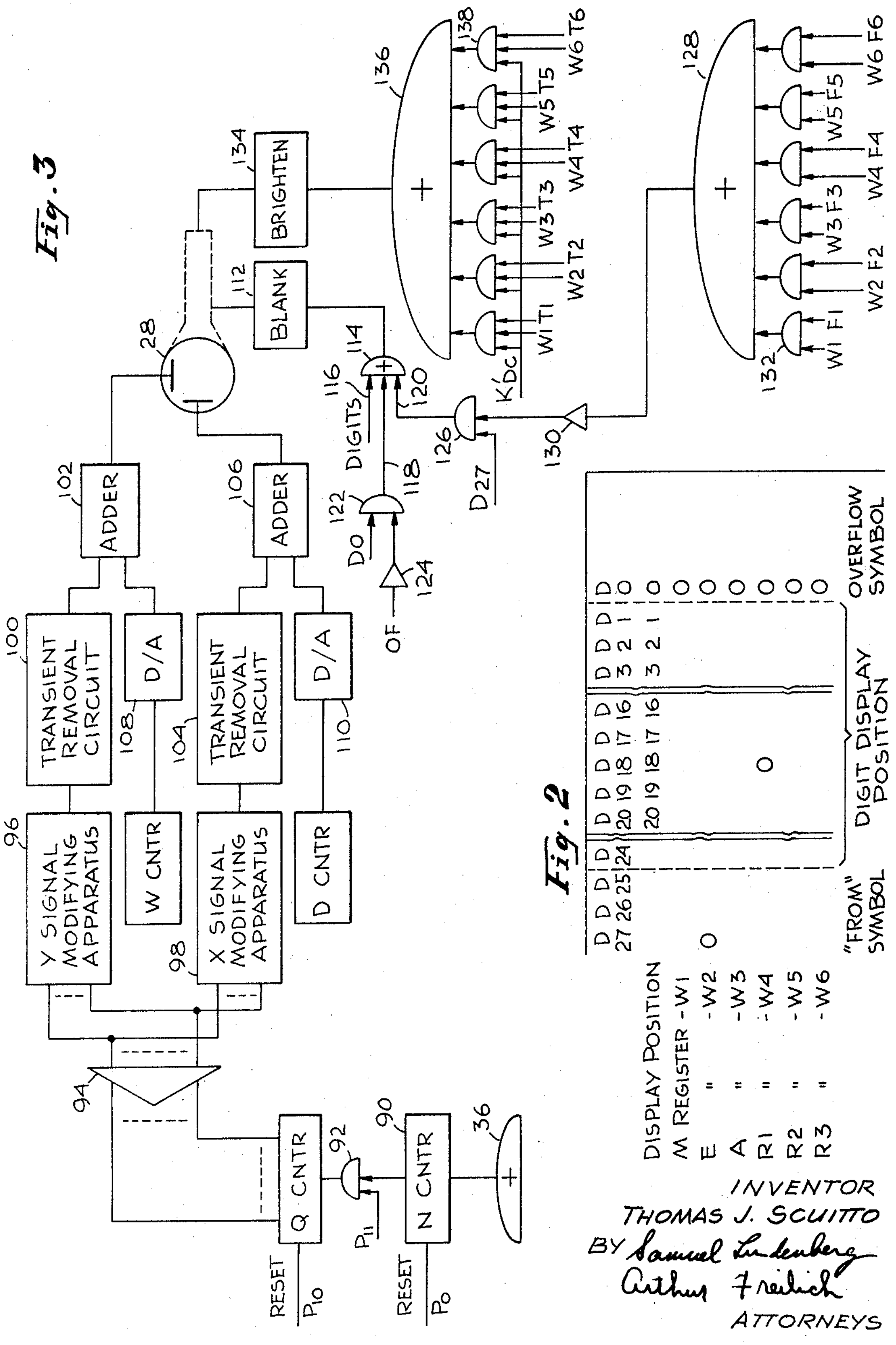
FIGURE 2 is a schematic diagram of an exemplary display which can be presented by the display means of FIGURE 1 in response to the occurrence of various conditions.
FIGURE 3 is a block diagram of a typical display means including logical circuits for causing the display of FIGURE 2 to be presented.

As disclosed in detail in the aforecited U.S. Patent No. 3,305,843, a cathode ray tube display means can be employed to continually display the contents of all of the register tracks of the memory 10. Thus, the information provided by Or gate 36 can be operated on by the logic network 38 to display the contents of each different register track at a different vertical position on the face of the cathode ray tube by permitting the output of the W counter to control the vertical deflection of the cathode ray tube. By permitting the output of the D counter 18 to control the horizontal deflection of the cathode ray tube, the digits in each number can be spaced horizontally across the tube face. The face of the tube is schematically illustrated in FIGURE 2 and is shown as including 24 digit display positions each corresponding to a different one of states D1 through D24 of the D counter. A different decimal digit can be displayed in each of these digit positions in each of the rows, each row being dedicated to a different register track. In accordance with the invention herein, means are provided which are responsive to the actuated TO and FROM keys and the C counter for visually displaying for the operator the registers from which information is to be transferred and the registers and digit position into which information is to be transferred. In order to indicate the register from which information is being transferred, a symbol, arbitrarily chosen to be a zero, is displayed in a position to the left of the digit display positions for that register. Thus, assuming that information is to be transferred from the E register, the zero symbol in display position 27 will be displayed as illustrated. The display position corresponding to the digit position in the memory into which information is to be transferred, is indicated by brightening the symbol presented thereat. Thus, assuming that the next digit to be written into the memory is to be stored in digit sector 18 of the register R1, then the digit displayed in position 18 will be brightened.

In certain arithmetic and aligning operations, the digits stored in a register overflow. As an example, consider the addition of two numbers which have digits in the most significant register stages which total more than nine. A second logic network 80 is provided which responds to the overflow condition to set an overflow flip-flop 82. The first logic network 38 is responsive to the setting of the overflow flip-flop 82 to display an overflow symbol, again arbitrarily a zero, to the right of the digit display positions, i.e., in display position zero, in all of the registers as illustrated in FIGURE 2.

Attention is now called to FIGURE 3 which illustrates one form of logic network 38 for controlling the cathode ray tube display means 28 for displaying the symbols illustrated in FIGURE 2. The apparatus of FIGURE 3 is similar to the apparatus disclosed in the aforecited U.S. Patent No. 3,305,843 but however has been modified to provide means responsive to the actuation of a FROM key, a TO key, and the setting of the overflow flip-flop 82 to display the symbols illustrated in FIGURE 2.

The apparatus of FIGURE 3 includes an N counter 90 having an incrementing input terminal which is connected to the output terminal of Or gate 36. Thus, during each digit period the N counter is incremented to a state represented by the total number of pulses read from the appropriate digit sector during that period. During period P11 of that digit period, the contents of the N counter are transferred in parallel through And gate 92 to the Q counter. The Q counter is reset prior thereto during period P10. The N counter is reset during period P0 after the contents thereof are transferred to the Q counter. The output of the Q counter is applied to a decoding circuit 94. The Q counter of course must be able to define ten different states to represent the ten different possible decimal digits which are to be displayed by the cathode ray tube. The decoding circuit 94 applies a signal to the output terminal thereof corresponding to the state of the Q counter. The output terminals of decoding circuit 94 are connected to the input terminals of both a Y signal modifying apparatus 96 and an X signal modifying apparatus 98. The output of the signal modifying apparatus 96 is connected to the input of a transient removal circuit 100 whose output in turn is connected to the input of an adder circuit 102. Similarly, the output of the signal modifying apparatus 98 is connected to the input of a transient removal circuit 104 whose output is connected to the input of an adder circuit 106. The output of the W counter is coupled through a digital-to-analog converter 108 to a second input of the adder circuit 102. Thus, the count in the W counter defines the gross vertical position of the cathode ray tube beam while the signals provided by the signal modifying apparatus 96 cause the beam to move in a vertical direction to trace the appropriate digit. Similarly, the output of the D counter is coupled through a digital-to-analog converter 110 to the input of adder circuit 106. The D counter thus establishes the gross horizontal position of the beam and the signals provided by the signal modifying apparatus 98 appropriately move the beam in a horizontal direction to trace the desired digits. The details of the apparatus thus far mentioned in FIGURE 3 are set forth in the aforementioned U.S. Patent No. 3,305,843 and will not be considered herein.

As indicated in that patent application, means must be provided in conjunction with the cathode ray display tube for selectively blanking the beam to properly trace certain digits. In accordance with the present invention, the blanking apparatus 112 can be used to aid in displaying the symbols representing the overflow condition and the register from which digits are to be transferred. Thus, when no FROM key has been actuated, display position 27 corresponding to the count of 27 in the D counter, should be blanked. Similarly, when no overflow condition exists, display position zero corresponding to a count of zero in the digit counter should be blanked. The output of the Or gate 114 is coupled to the blanking means 112 to blank the beam. Conductor 116 connected to the input of Or gate 114 is utilized for the purpose of blanking portions of selected digits as disclosed in the U.S. Patent No. 3,305,843. Conductor 118 causes display position zero to be normally blanked while conductor 120 causes display position 27 to be normally blanked.

Conductor 118 is derived from the output of And gate 122 which is normally enabled whenever the D counter defines a count of zero. The output of the overflow flip-flop 82 is connected through an inverter 124 to the input of And gate 122. Thus, when the overflow flip-flop 82 is true, the output of inverter 124 will be false and thus the output of And gate 122 will be false. Accordingly, And gate 122 will cause the zero display position on the cathode ray tube face to be blanked at all times except when the overflow flip-flop is true.

The conductor 120 is derived from the output of And gate 126 which is normally true whenever the D counter defines a count of 27 corresponding to display position 27. The output of And gate 26 is however made false whenever the output of Or gate 128 is true. The output of Or gate 128 is connected through an inverter 130 to the input of And gate 126. Each of the inputs to Or gate 128 is derived from a different And gate 132. Each of the And gates 132 has an input derived from a different one of the decoding circuit 26 output terminals and also an input derived from the corresponding FROM switch. Thus, when FROM switch F2 is actuated for example, a symbol will be display in display position 25 when a signal is applied to output terminal W2 of the decoding circuit 26.

In order to brighten a displayed digit to indicate the position into which the next entered digit will be stored, a brightening means 134 which controls the cathode ray tube beam intensity, is provided. The brightening means is enabled in response to Or gate 136 providing a true output signal. Each of the inputs to Or gate 136 is derived from the output of a different And gate 138. Each of the And gates 138 has first and second input terminals which are respectively derived from different output terminals of the W counter decoding circuit 26 and the TO keys on the keyboard 40. The output of the delay circuit 64 providing the signal $K'_{DC}$ is connected in common to all of the And gates 138. Thus, whenever a TO key is actuated, the cathode ray tube beam will be intensified so as to brighten the resulting displayed character, during the digit period in which signal $K'_{DC}$ is developed. Because of the one digit period delay introduced between the N counter and Q counter, the signal $K'_{DC}$ is employed to enable the And gates 138 rather than the signal $K_{DC}$.

From the foregoing, it should be appreciated that apparatus has been disclosed herein for utilization with calculating apparatus of the type generally described for facilitating operation of the calculating apparatus by displaying to an operator the register from which digits are to be transferred, the digit position in the memory into which the next entered digit is to be stored, and the establishment of an overflow condition.

I claim:

1. A calculator apparatus comprising:

a memory including a plurality of number storing register tracks, each register track including a plurality of digit sectors and a first space sector;

a sector counter capable of defining a number of counts each corresponding to a different one of said sectors in each of said tracks;

first timing signal means for periodically incrementing said sector counter;

means for sequentially accessing a digit from each of said sectors coincident with said sector counter defining the count corresponding thereto;

a word counter capable of defining a number of counts each corresponding to a different one of said register tracks;

second timing means for periodically incrementing said word counter;

means for sequentially accessing a number from each of said register tracks coincident with said word counter defining the count corresponding thereto;

display means including vertical and horizontal deflection means;

means coupling said word counter to said vertical deflection means;

means coupling said sector counter to said horizontal deflection means;

first means for normally blanking said display means when said sector counter defines a count corresponding to said first space sector;

a keyboard including a plurality of register keys each corresponding to a different one of said register tracks; and means responsive to the actuation of one of said register keys for inhibiting said first blanking means when said word counter defines the count corresponding thereto.

2. The apparatus of claim 1 wherein each of said register tracks includes a second space sector and wherein means are provided for performing operations on said numbers stored in said register tracks;

a second means for normally blanking said display means when said sector counter defines a count corresponding to said second space sector; and means responsive to an overflow signal for inhibiting said second blanking means when said sector counter defines the count coresponding to said second space sector.

References Cited

UNITED STATES PATENTS

| | | | |
|---|---|---|---|
| 3,166,636 | 1/1965 | Rutland et al. | 178—24 |
| 3,187,167 | 6/1965 | Berezin | 235—159 |
| 3,254,204 | 5/1966 | Merner | 235—160 |
| 3,265,874 | 8/1966 | Soule et al. | 235—159 |
| 3,328,763 | 6/1967 | Rathburn et al. | 340—172.5 |

MALCOLM A. MORRISON, *Primary Examiner.*

D. H. MALZAHN, *Assistant Examiner.*

U.S. Cl. X.R.

235—159; 34—172.5